(12) United States Patent
Mitteer et al.

(10) Patent No.: US 10,088,040 B2
(45) Date of Patent: Oct. 2, 2018

(54) SHIFTER WITH ELECTROMAGNETIC PARK LOCK SYSTEM

(71) Applicant: GHSP, Inc., Grand Haven, MI (US)

(72) Inventors: David Michael Mitteer, Shelby, MI (US); Ian Patrick Sage, Holland, MI (US)

(73) Assignee: GHSP, Inc., Grand Haven, MI (US)

( * ) Notice: Subject to any disclaimer, the term of this patent is extended or adjusted under 35 U.S.C. 154(b) by 283 days.

(21) Appl. No.: 14/714,636

(22) Filed: May 18, 2015

(65) Prior Publication Data

US 2015/0362067 A1  Dec. 17, 2015

Related U.S. Application Data

(60) Provisional application No. 62/013,178, filed on Jun. 17, 2014.

(51) Int. Cl.

| | |
|---|---|
| *B60K 20/00* | (2006.01) |
| *G05G 5/08* | (2006.01) |
| *F16H 61/22* | (2006.01) |
| *F16H 59/02* | (2006.01) |
| *F16H 59/54* | (2006.01) |
| *F16H 59/74* | (2006.01) |

(52) U.S. Cl.
CPC ......... *F16H 61/22* (2013.01); *F16H 59/0208* (2013.01); *F16H 59/0278* (2013.01); *F16H 59/54* (2013.01); *F16H 2059/0282* (2013.01); *F16H 2059/746* (2013.01); *F16H 2061/223* (2013.01); *Y10T 74/20341* (2015.01)

(58) Field of Classification Search
CPC .... F16H 61/22; F16H 2061/223; F16H 59/54; F16H 2059/746; F16H 2059/0282; F16H 59/0278; F16H 59/0208
See application file for complete search history.

(56) References Cited

U.S. PATENT DOCUMENTS

| | | | |
|---|---|---|---|
| 4,473,141 A * | 9/1984 | Mochida | B60T 15/14 192/220.2 |
| 7,779,715 B2 | 8/2010 | Mitteer | |
| 8,117,938 B2 | 2/2012 | Mitteer | |
| 8,770,057 B2 | 7/2014 | Ruhl | |
| 2008/0092608 A1* | 4/2008 | Wang | F16H 61/21 70/201 |
| 2014/0000403 A1* | 1/2014 | Kim | F16H 61/22 74/473.21 |

\* cited by examiner

*Primary Examiner* — Jake Cook
(74) *Attorney, Agent, or Firm* — Price Heneveld LLP

(57) ABSTRACT

A park lock system for a shifter of an automatic transmission, according to one embodiment, includes a blocking member pivotal between a locked position to prevent movement of the shifter and an unlocked position for allowing movement of the shifter. At least a portion of the blocking member may include hard magnetic properties, such as having a permanent magnet coupled therewith. An electromagnet may have a core member proximate the magnetic portion of the blocking member to cause the blocking member to move to or remain in the locked position when the electromagnet is de-energized. Accordingly, when the electromagnet is energized, the electromagnet may be configured to generate a magnetic field in repelling polarity to the magnetic portion that causes the blocking member to move to the unlocked position.

23 Claims, 8 Drawing Sheets

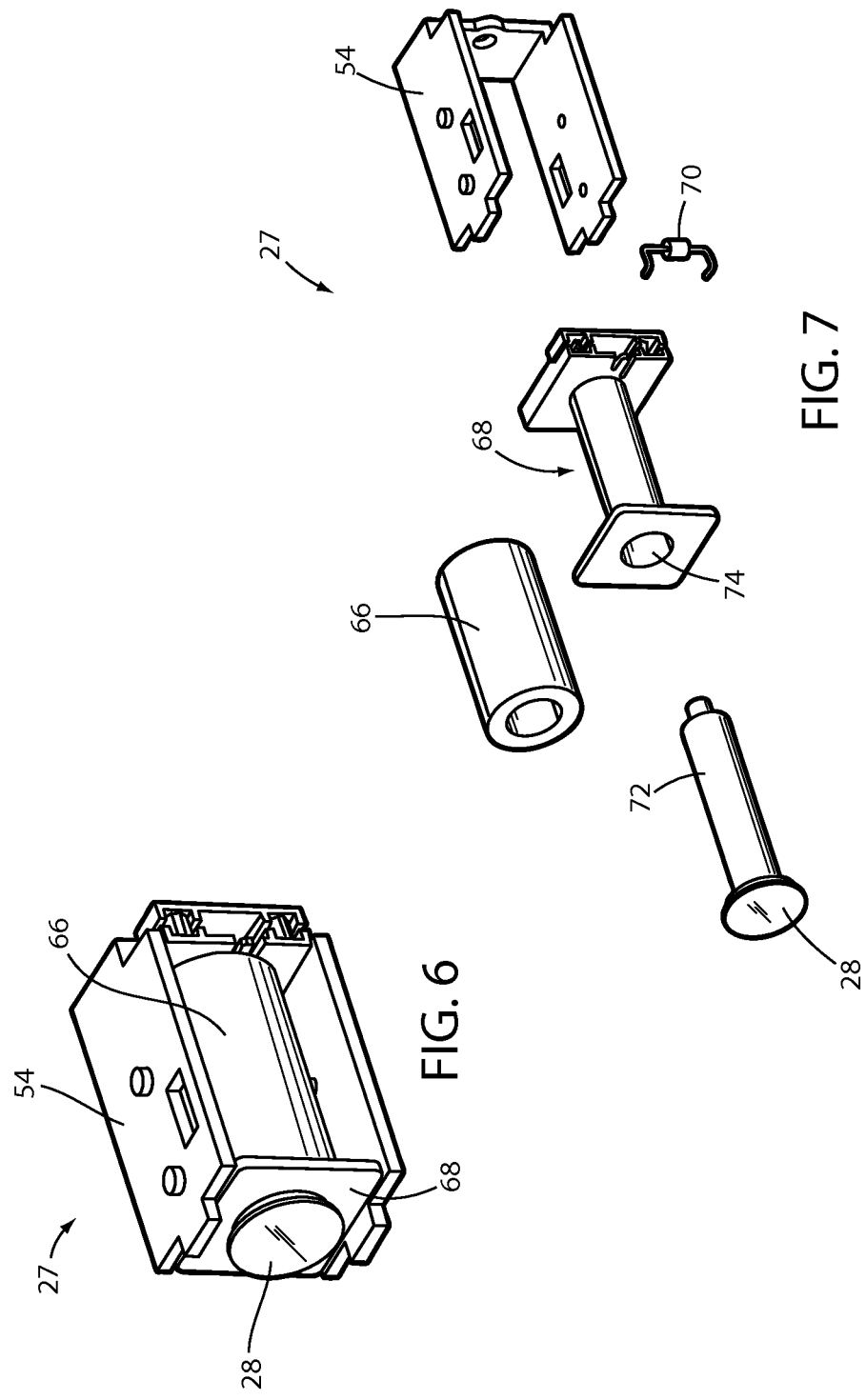

SHIFTER WITH ELECTROMAGNETIC PARK LOCK SYSTEM

This application claims benefit under 35 USC section 119(e) to U.S. Provisional Application No. 62/013,178, filed on Jun. 17, 2014, entitled SHIFTER WITH ELECTROMAGNETIC PARK LOCK SYSTEM, the disclosure of which is hereby incorporated herein by reference in its entirety.

FIELD OF THE INVENTION

The present invention generally relates to a lock system for moving a blocking member between a lock position and an unlock position, and more specifically to a park lock system for a shifter of an automatic transmission. However, it is contemplated that the present concept is not limited to vehicle shifters, nor to only park lock systems, but instead is applicable for any locking mechanism where a blocking member must be held in a selected position and then released with a force to move the blocking member.

BACKGROUND

It is generally understood that automatic vehicle transmissions include shifters that are held in a park mode until an ignition of a vehicle is on and a brake pedal of the vehicle is depressed. To hold the shifter in the park mode it is common for a solenoid actuator to mechanically displace a blocking member or cam. However, the actuation of solenoids in the present state of the art can result in distracting noise that may be associated with inferior quality and may lead to deterioration as a result of the associated friction.

SUMMARY OF THE PRESENT INVENTION

According to one aspect of the present invention, a lock system is provided for moving a blocking member between a locked position and an unlocked position. The blocking member includes at least a portion that has hard magnetic properties, defining a magnetic portion. The lock system also includes an electromagnet separate from the blocking member that has a core member proximate the magnetic portion of the blocking member and comprises a ferromagnetic material attracted by the magnetic portion for holding the blocking member in the locked position. The electromagnet is configured to generate a magnetic field in like polarity to the magnet portion of the blocking member that causes the blocking member to move away from the core member to the unlocked position.

According to another aspect of the present invention, a park lock system for a shifter of an automatic transmission includes a blocking member having a pivot axis for pivoting the blocking member between a locked position to prevent movement of the shifter and an unlocked position for allowing movement of the shifter. A permanent magnet is coupled with the blocking member. An electromagnet has a core member proximate the permanent magnet and is configured to generate a magnetic field in like polarity to the permanent magnet that causes the blocking member to move to the unlocked position.

According to yet another aspect of the present invention, a park lock system is provided for a shifter of an automatic transmission that is movable between operating modes of the automatic transmission, including a park mode. The park lock system includes a shifter housing having a gate opening with a series of notches, including a park notch. A pawl member is movable within the gate opening for engaging a select one of the series of notches to engage a corresponding operating mode of the automatic transmission, including the park notch to engage the park mode. A blocking member is pivotally coupled with the shifter housing and has a first portion, a second portion, and a pivot axis therebetween for pivoting the blocking member between a locked position for the first portion to prevent movement of the pawl member out of the park notch and an unlocked position for allowing movement of the pawl member out of the park notch. A permanent magnet is coupled with the second portion of the blocking member. An electromagnet is coupled with the shifter housing proximate the second portion of the blocking member, wherein the electromagnet is configured to generate a magnetic field in like polarity to the permanent magnet that causes the blocking member to move to the unlocked position.

According to another aspect of the present invention, a method for operating a park lock apparatus for a shifter of a vehicle provides a blocking member that is movable between a first position for preventing movement of the shift lever from a home position and at least a second position for allowing movement of the shift lever. The blocking member includes a magnetic portion. The method also provides an electromagnet having a core member proximate the magnetic portion. Further, the method provides a step of determining whether an ignition state of the vehicle is on. The method also provides a step of sensing whether a brake pedal state of the vehicle is depressed. The method further provides a step of generating a magnetic field with the electromagnet in repelling polarity to the magnetic portion of the blocking member that causes the blocking member to move to the unlocked position for allowing movement of the shift lever to the park mode from the home position.

According to yet another aspect of the present invention, a lock system for moving a blocking member between a locked position and an unlocked position includes a permanent magnet coupled with the blocking member. The lock system also includes an electromagnet having a core member proximate the permanent magnet that comprises a ferromagnetic material attracted by the permanent magnet for holding the blocking member in the locked position. The electromagnet is configured to generate a magnetic field in like polarity to the permanent magnet that moves the permanent magnet away from the core member for moving blocking member to the unlocked position. This configuration reduces cost and complexity over prior lock systems by reducing the number of components required to achieve the actuation event and reducing the number of moving parts of the subsystem, as the electromagnet is stationary and the only moving parts are the blocking member and a dampener. This also has the advantage of having dramatically less noise generated during the actuation event than the current state of the art.

These and other aspects, objects, and features of the present invention will be understood and appreciated by those skilled in the art upon studying the following specification, claims, and appended drawings.

BRIEF DESCRIPTION OF THE DRAWINGS

FIG. 6 is a top perspective view of an electromagnet assembly, according to one embodiment;

FIG. 7 is an exploded top perspective view of the electromagnet assembly shown in FIG. 6.

DETAILED DESCRIPTION OF THE PREFERRED EMBODIMENTS

Figure 1:
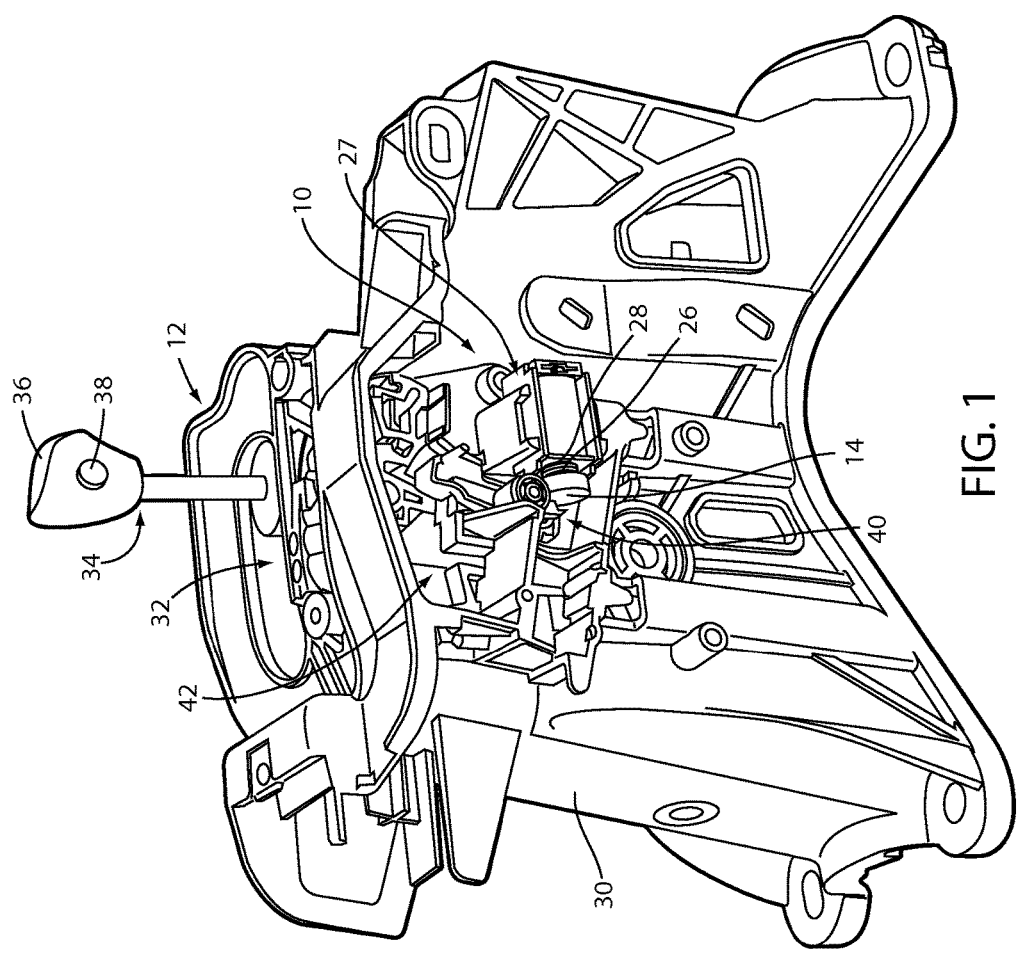
FIG. 1 is a top perspective view of a shifter housing having components of a park lock system exploded away from the shifter housing.

For purposes of description herein, it is to be understood that the disclosed lock system and related methods may assume various alternative embodiments and orientations, except where expressly specified to the contrary. It is also to be understood that the specific devices and processes illustrated in the attached drawings, and described in the following specification are simply exemplary embodiments of the concepts defined in the appended claims. While various aspects of the lock system and related methods are described with reference to a particular illustrative embodiment, the disclosed invention is not limited to such embodiments, and additional modifications, applications, and embodiments may be implemented without departing from the disclosed invention. Hence, specific devices and other physical characteristics relating to the embodiment disclosed herein are not to be considered as limiting, unless the claims expressly state otherwise.

Referring to FIGS. 1-8, reference numeral 10 generally designates a lock system that is illustrated for use in association with a shifter 12 of an automatic transmission of a vehicle, which may be referred to as a park lock system 10. The lock system 10 includes a blocking member 14 that is moveable between a locked position 16 and an unlocked position 18. In the illustrated embodiment, the blocking member 14 is pivotal about a pivot axis 20 to move the blocking member 14 between the locked and unlocked positions 16, 18, whereby a first portion 22 and a second portion 24 of the blocking member 14 are defined on opposing sides of the pivot axis 20, although a blocking member can be contemplated with only the first portion 22. A magnetic portion of the blocking member 14, such as a permanent magnet 26, may be coupled with the second portion 24 of the blocking member 14, as illustrated, or the first portion 22 in additional embodiments. Further, an electromagnet 27, such as an electromagnet assembly, may be arranged proximate the magnetic portion of the blocking member 14, shown as the permanent magnet 26, such that the magnetic portion is magnetically attracted to a core member 28 of the electromagnet 27 for holding the blocking member 14 in the locked position 16. Accordingly, the electromagnet 27 may be configured to generate a magnetic field in like or otherwise repelling polarity to the permanent magnet 26 that causes the magnetic portion to move away from the core member 28 and displace the blocking member 14 to the unlocked position 18 in a quiet manner. In the illustrated embodiment, the unlocked position 18 of the blocking member 14 allows for movement of the shifter 12 out of a park mode of the automatic transmission. It is contemplated that the lock system 10 in additional embodiments may be used in association with alternative devices, on a vehicle or elsewhere.

Referring now to the embodiment illustrated in FIG. 1, a shifter base 30 is shown that is adapted to be attached to a vehicle floor between front vehicle seats, which may define a portion of a center console. The illustrated shifter base 30 is a polymeric molding that includes an elongated aperture 32 longitudinally oriented in an upper portion of the shifter base 30. A shift lever 34 is moveably coupled with the shifter base 30 and positioned to extend vertically through the elongated aperture 32, whereby the shift lever may be manipulated longitudinally within the elongated aperture 32 for adjusting the operating mode of an automatic transmission of the vehicle, such as the park mode, a drive mode, a neutral mode, a reverse mode, and other generally understood operating modes. In the illustrated embodiment, the shift lever 34 includes a tubular shaft with a hand grip 36 attached to an upper end of the shaft. A button 38 is provided on the hand grip 36, which may be depressed to generate a shift request and/or mechanically actuate a pawl member to allow movement of the shifter 12 between at least two discrete operating modes of the automatic transmission.

As also illustrated in FIG. 1, a shifter housing 40 is provided below the elongated aperture 32 that has a gate opening 42 with a series of notches 44 that each correspond with at least one operating mode of the automatic transmission. In the illustrated embodiment, the shifter housing 40 is a molded integral piece of the shifter base 30, although it is conceivable that the shifter housing 40 may be a partially or completely separate piece from the shifter base 30 and may be alternatively oriented and positioned relative to the shift lever 34 and the elongated aperture as shown in the embodiment illustrated in FIG. 1. It is also contemplated that the shifter 12 in additional embodiments may be a lever on a steering column, a rotary shift knob, an electrical shifting device, such as a series of buttons, and other conceivable shifting devices as generally understood by one having ordinary skill in the art.

Figure 2:
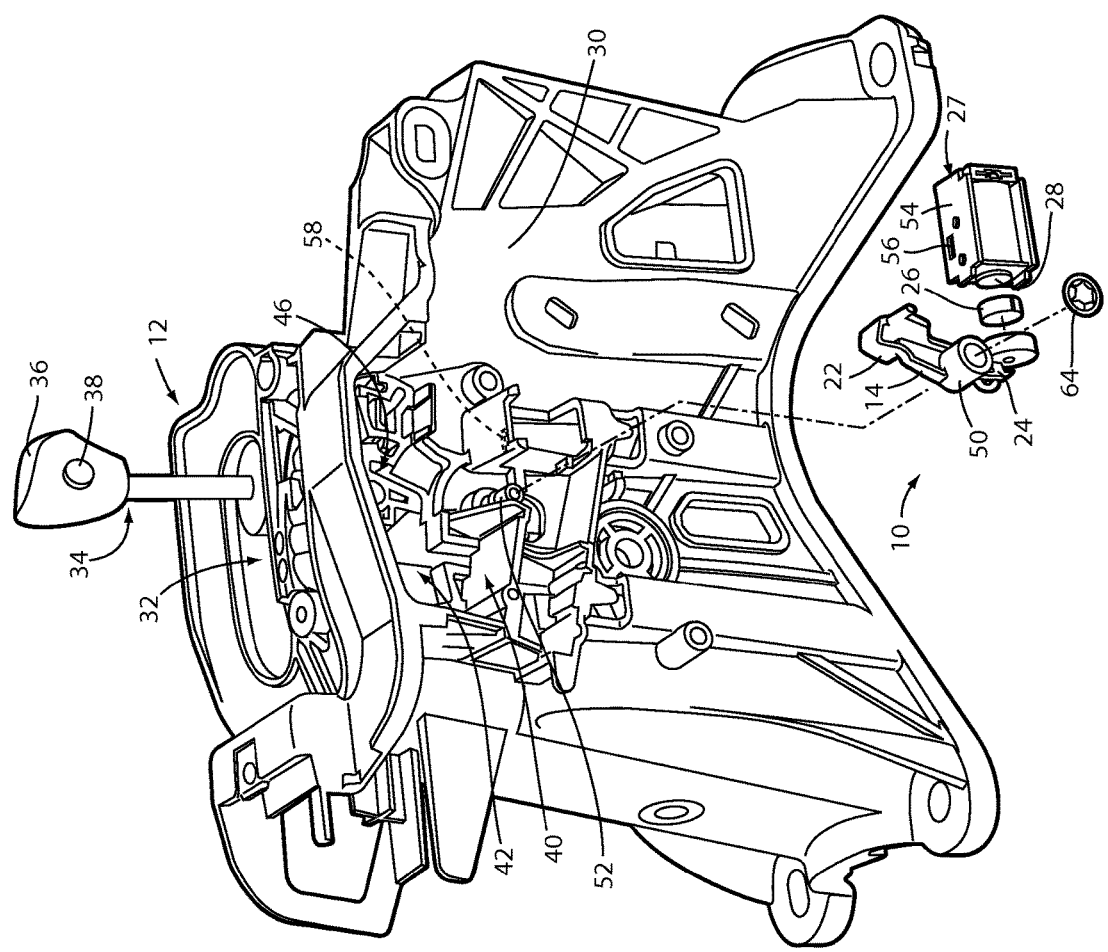
FIG. 2 is an exploded top perspective view of various components of the park lock system exploded away from the shifter housing, according to the embodiment illustrated in FIG. 1.
Figure 3:
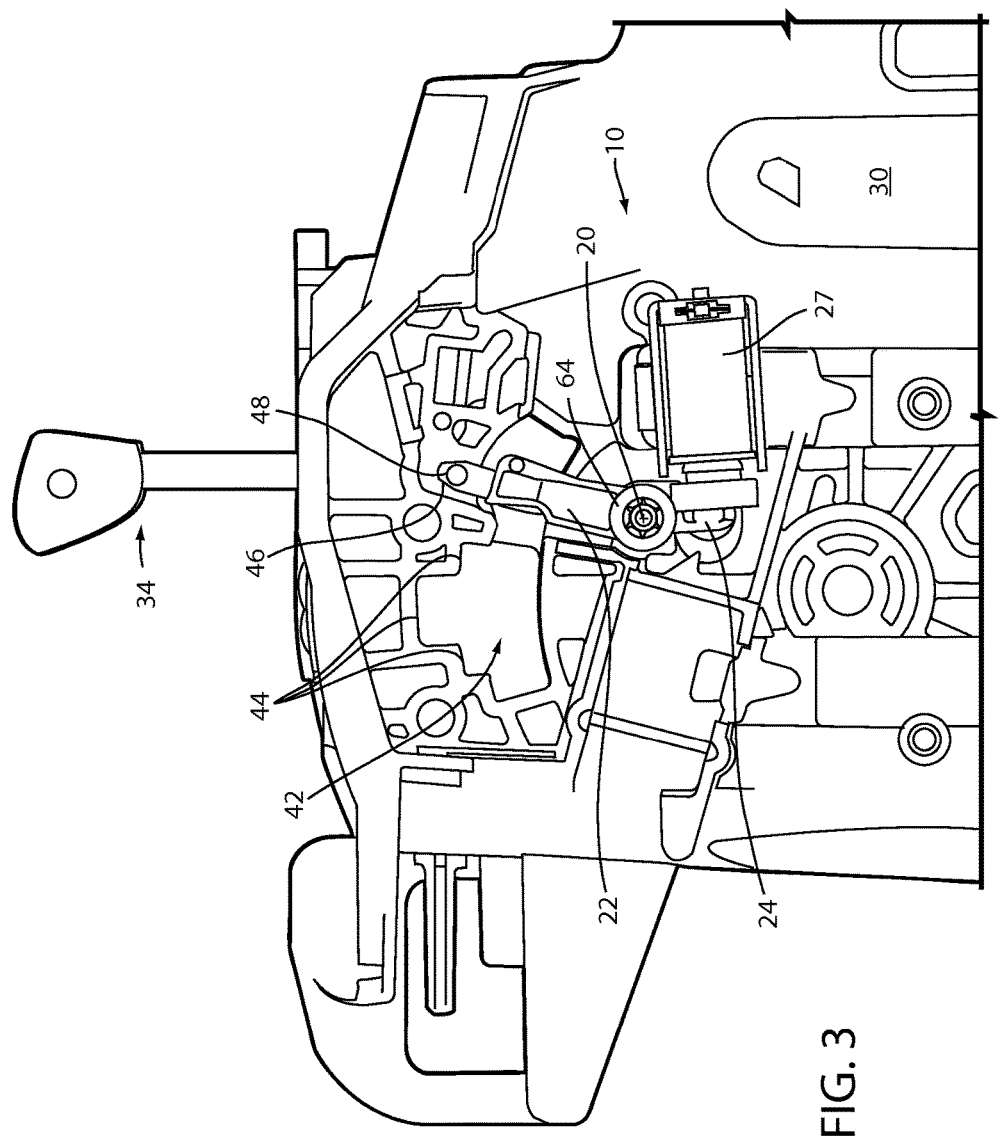
FIG. 3 is a side elevational view of the park lock system according to the embodiment illustrated in FIG. 1, showing a gate opening of the shifter housing and a blocking member assembled to the shifter housing along with an associated electromagnet assembly.

With reference to the embodiment illustrated in FIGS. 2-3, a park notch 46 of the series of notches 44 in the gate opening 42 is shown in a generally vertical orientation, such that a pawl member 48 must move downward out of the park notch 46 before it may enter other notches in the gate opening 42 and engage other operating modes of the automatic transmission. To prevent the pawl member 48 from exiting the park notch 46, such as when certain status conditions of the vehicle are not satisfied (e.g., an ignition condition of the vehicle and a brake pedal condition of the vehicle), the first portion 22 of the blocking member 14 may be positioned to obstruct any downward movement of the pawl member 48. For instance, in one embodiment, when the button 38 on the hand grip 36 of the shift lever 34 is depressed, the pawl member 48 will attempt to move downward out of the park notch 46 and into the gate opening 42 to engage a different operating mode of the automatic transmission. The blocking member 14 in the illustrated embodiment is displaced out of the locked position 16 by activation of the electromagnet 27, which may be operated by control circuitry, such as a controller as shown and described herein. It should be appreciated that the controller may be a stand-alone dedicated controller or may be a shared controller integrated with other control functions, such as integrated with a transmission controller or other conceivable onboard or off-board vehicle control systems.

In the embodiment illustrated in FIGS. 2-3, the blocking member 14 has a central section 50 with a cylindrical shape that is coaxially aligned with the pivot axis 20 of the blocking member 14. As such, the central section 50 of the blocking member 14 has a cavity that engages a fixed post 52 extending laterally from the shifter housing 40 to allow for pivoting movement of the blocking member 14 about the pivot axis 20 between the locked and unlocked positions 16, 18. The first portion 22 of the blocking member 14 in the illustrated embodiment extends upward from the central section 50 and has a length greater than the second portion 24 of the blocking member 14, which extends generally downward from the central section 50. The length difference in the first and second portions 22, 24 allows for movements of the end of the second portion 24 to be exaggerated at the end of the first portion 22 due to simple mechanical leverage. The magnetic portion of the blocking member 14 in the illustrated embodiment is a permanent magnet 26 that is coupled with a rearward facing surface of the second portion 24 of the blocking member 14 proximate the end thereof to interact with the electromagnet 27 in a manner that takes advantage of this leverage to move the first portion 22 of the blocking member 14 away from the park notch 46. The permanent magnet 26 may be affixed to the blocking member 14 with adhesive, embedded during molding, frictionally retained after molding, mechanically fastened, or other conceivable means for rigidly attaching the permanent magnet 26 to the blocking member 14. Also, the magnetic portion of the blocking member 14 in additional embodiments may be an integral portion of the blocking member.

As also shown in the embodiment illustrated in FIGS. 2-3, the electromagnet assembly 27 is coupled with the shifter housing 40 to align a central axis of the core member 28 with the direction of polarity of the permanent magnet 26 when the blocking member 14 is in the locked position 16 (FIG. 3). To fix the electromagnet assembly 27 to the shifter housing 40, an outer frame 54 of the electromagnet assembly 27 may have attachment holes 56 formed on an upper surface and a lower surface thereof to snap fit into engagement with clips 58 formed into lateral protrusions of the shifter housing 40. It is also contemplated that the electromagnet assembly 27 may be alternatively coupled with the shifter housing 40 or another portion of the shifter base 30, such as with fasteners, adhesive, frictional retention, molded engagement, and other conceivable means of attachment.

Figure 4:
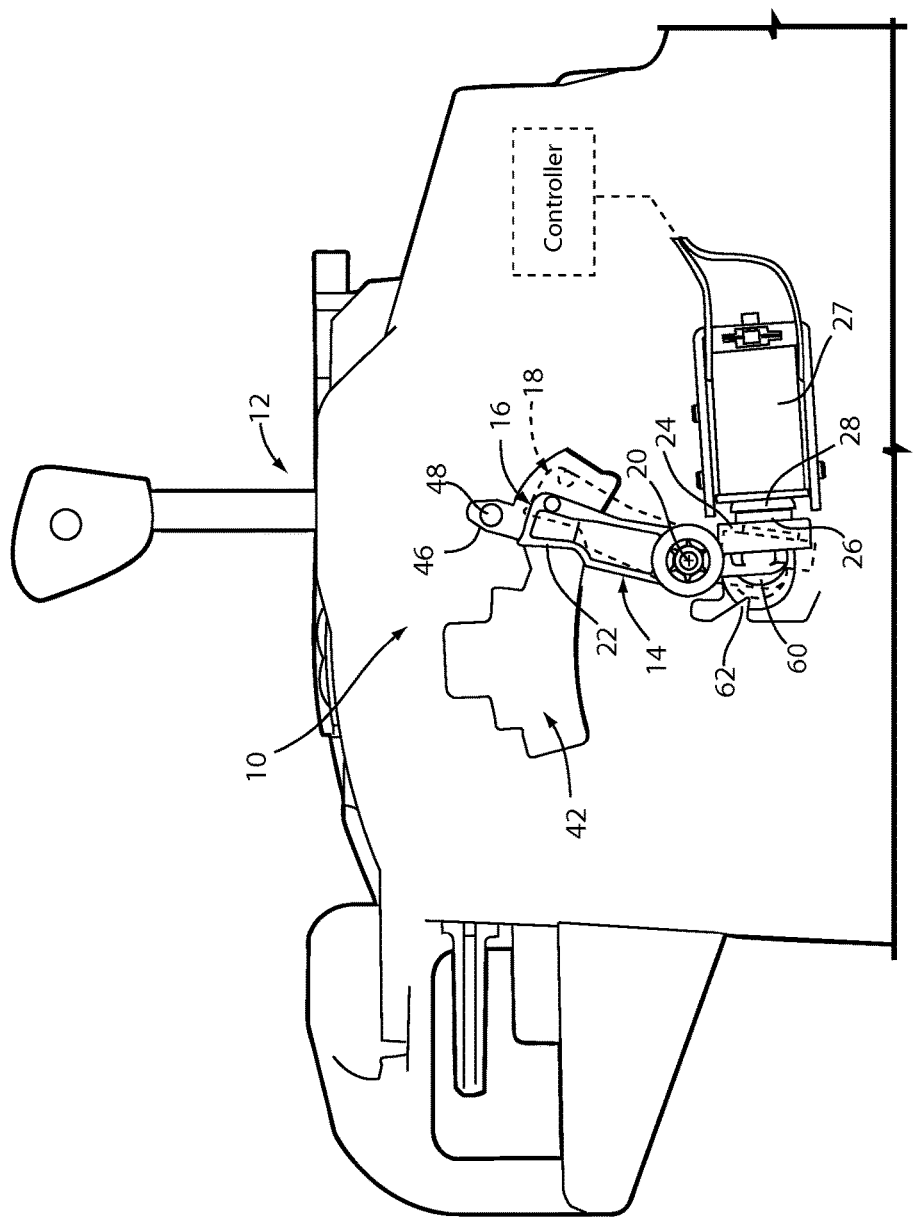
FIG. 4 is a schematic side elevational view of a park lock system illustrating a pawl member and other components of the park lock system, according to one embodiment.
Figure 4A:
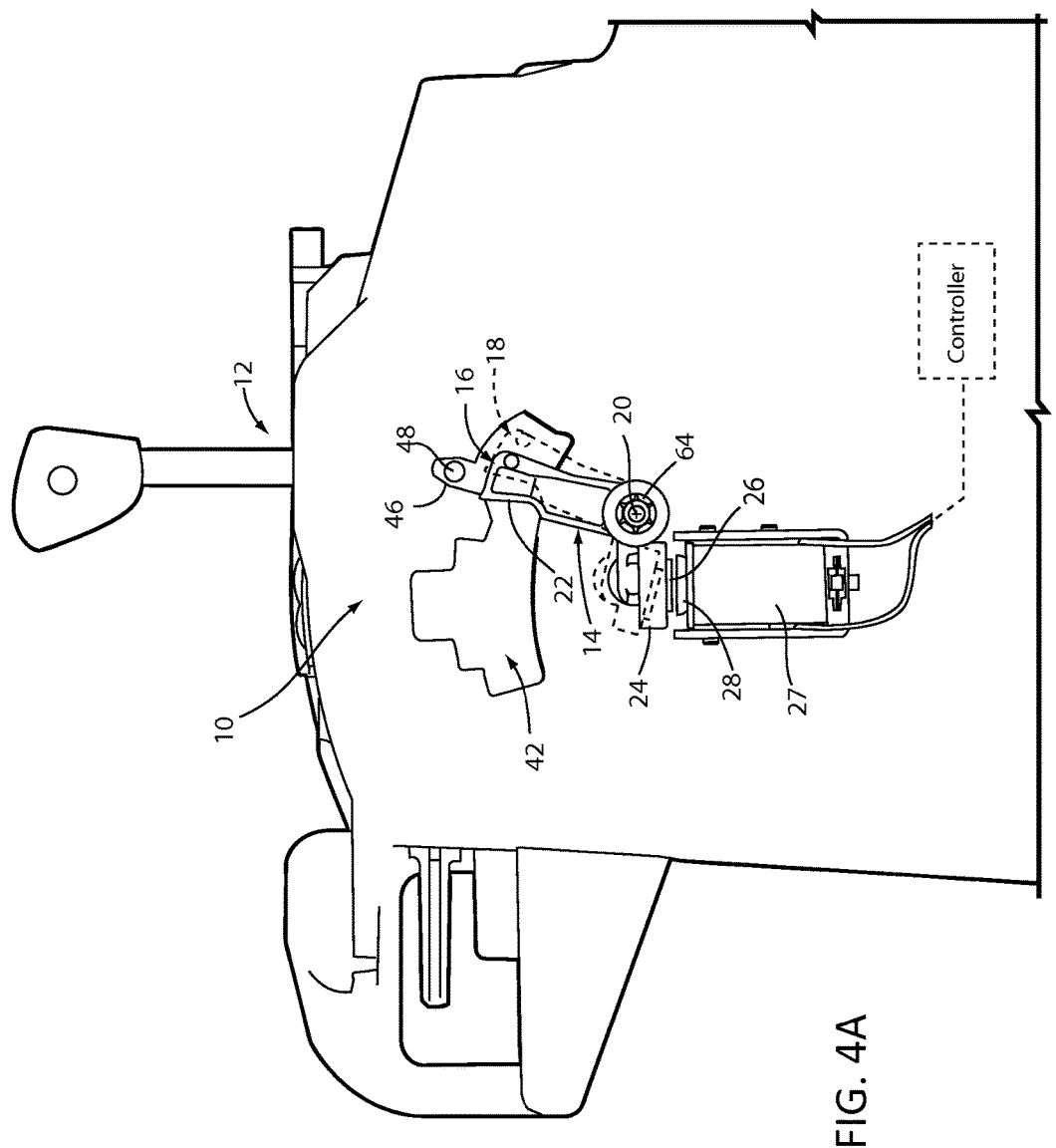
FIG. 4A is a schematic side elevational view of a park lock system illustrating a pawl member and other components of the park lock system, according to an additional embodiment.

Referring now to FIGS. 4-4A, two embodiments of the park lock system 10 are substantially illustrated with the blocking member 14 having different shapes and the electromagnet assembly 27 alternatively positioned. In addition to these illustrated embodiments, it is conceivable that the blocking member may be alternatively moveable, such as by sliding or rotating, and the electromagnet assembly 27 may be alternatively oriented or arranged, such as to pivot the blocking member laterally opposed to longitudinally.

With reference to FIG. 4, the second portion 24 of the blocking member 14 is configured with a dampener 60 attached to a forward facing surface opposite the permanent magnet 26. The dampener 60 is arranged to abut a rearwardly directed tab 62 to restrict further pivotal movement of the blocking member 14, as the first portion 22 of the blocking member 14 is prohibited from moving rearward any further in the unlocked position 18 when the dampener 60 abuts the tab 62. Similarly, the first portion 22 of the blocking member 14 may abut a rearward facing surface of the park notch 46 or another detent formed in the shifter housing 40 to prevent an exterior surface of the permanent magnet 26 from coming into abutting contact with the core member 28 of the electromagnet assembly 27. Both preventing the blocking member 14 and permanent magnet 26 from magnetically attaching to the core member 28 and providing a dampener 60 on the second portion 24 of the blocking member 14 reduce the noise created from the blocking member 14 moving between the locked and unlocked positions 16, 18. As such, the dampener 60 in the illustrated embodiment comprises an elastomeric material to further prevent noise upon contact with the tab 62. It is also contemplated that other portions of the blocking member 14, shifter housing 40, or other portions of the park lock system 10 that may come into some form of contact during movement of the blocking member 14 may be comprised of an elastomeric material or other materials with a low durometer and that are configured to dampen noise upon contact.

With reference to the embodiment illustrated in FIG. 4A, the blocking member 14 is alternatively shaped from the embodiment illustrated in FIG. 4. More specifically, the second portion 24 of the blocking member 14 protrudes forward from the central section 50 to define a generally L-shape. Accordingly, the electromagnet assembly 27 is located below the blocking member 14 and is oriented with the central axis of the core member 28 in a vertical orientation. In this arrangement, the permanent magnet 26 remains spaced from the core member 28 in both the locked and unlocked positions 16, 18. However, when the blocking member 14 is moved to the unlocked position 18 the weight of the permanent magnet 26 may be configured to draw the second portion 24 of the blocking member 14 downward to move the blocking member 14 to the locked position 16 when the electromagnet 27 stops generating the magnetic field that raises the permanent magnet 26 and places the blocking member 14 in the unlocked position 18. As such, the weight of the magnetic portion of the blocking member 14, shown as the permanent magnet 26, may be relied upon to return the blocking member 14 to the locked position 16 opposed to having to utilize the magnetic attraction of the permanent magnet 26 to the core member 28. With the use of the weight of the permanent magnet 26 to move the blocking member 14 out of the unlocked position 18, the permanent magnet 26 may be located outside of a distance in which the magnetic field generated by the permanent magnet 26 draws the blocking member 14 from the unlocked position 18 toward the core member 28 to the locked position 16. It is also contemplated that such an arrangement with sufficient weight will therefore allow for a permanent magnet 26 with less magnetism to be used. In addition to or in the alternative to relying upon the weight of the second portion 24 of the blocking member 14, the flow of current through the electromagnet 27 may be reversed to provide an increased attraction between the magnetic portion 26 of the blocking member 14 to return the blocking member to the locked position 16. The embodiment illustrated in FIG. 4A also includes a dampener 60A on a rearward facing surface of the first portion 22 of the blocking member 14 to abut a forward extending tab 62A on the shifter housing 40.

Figure 5:
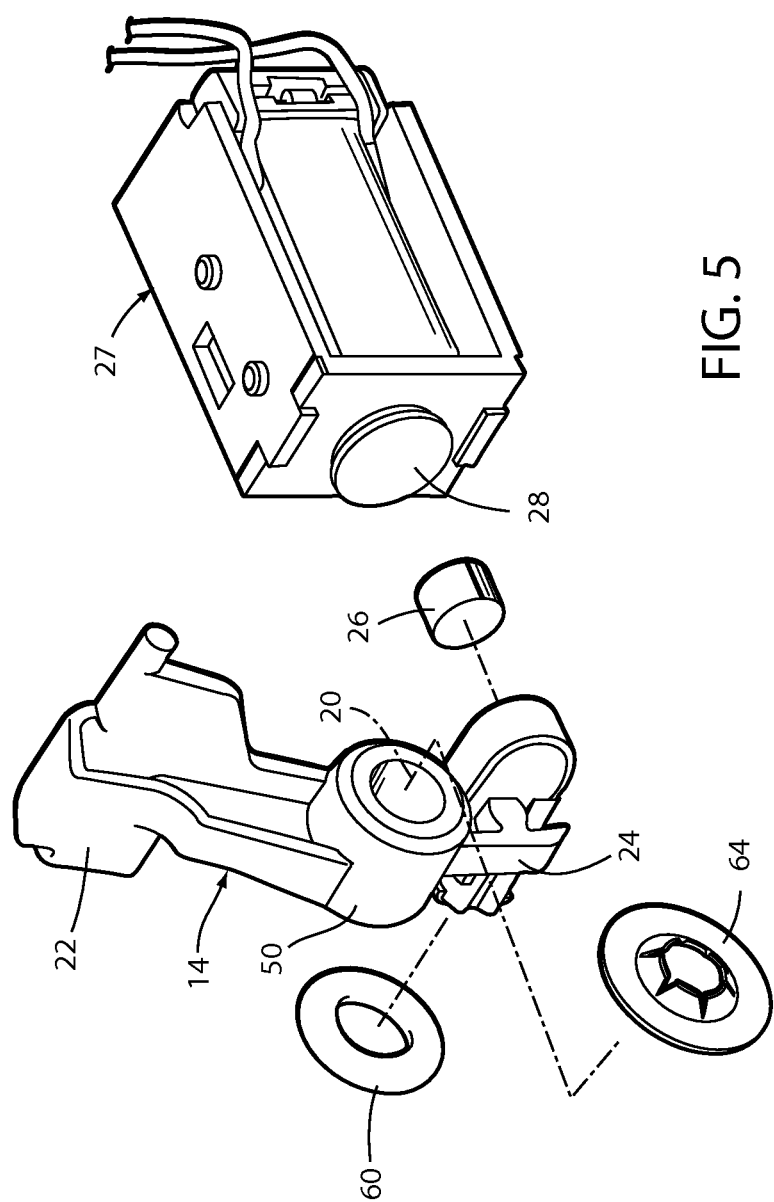
FIG. 5 is an exploded top perspective view of a blocking member, a permanent magnet, and an electromagnet assembly, according to the embodiment illustrated in FIG. 1.

With reference to the embodiment illustrated in FIG. 5, the permanent magnet 26 has a cylindrical shape with a diameter of 6.35 mm that is configured to be insert molded or snapped in to the second portion 24 of the blocking member 14. It is also contemplated that a permanent magnet 26 having a diameter of 12.7 mm and an axial aperture of approximately 3.2 mm may also be used. Accordingly, it is conceivable that alternatively shaped and sized magnetic portions or permanent magnets may be integrated with or otherwise attached to the second portion 24 of the blocking member 14 for optimized and reliable operation of the locking system 10. In addition, it is conceivable that the magnetic portion of the blocking member 14, including the permanent magnet 26, may be a rare earth magnet selected from neodymium-type magnets or samarium cobalt-type magnets, ferrite ceramic magnets, or other conceivable hard magnet types. The magnetic portion of the blocking member 14 may be in-molded, overmolded, injection molded bonded, compression molded and post-mold inserted, or any other of many well-known manufacturing practices of putting hard magnetic property material into a non-magnetic property carrier material. In additional embodiments, the blocking member 14 may also be coupled to an electromagnet, although wiring of such an arrangement would cause added complexity.

As also shown in FIG. 5, a push nut 64 is illustrated that attached to the fixed post 52 (FIG. 2) that the blocking member 14 pivots about. The push nut 64 has a diameter substantially greater than the interior diameter of the cavity in the central section 50 of the blocking member 14 to support pivotal movement of the blocking member 14 between the locked and the unlocked positions 16, 18. More specifically, the push nut 64 prevents lateral movement of the blocking member 14 and prevents deflection of the blocking member 14 from torsion that may result when the electromagnet 27 generates the magnetic field in like or otherwise repelling polarity to the magnetic portion 26 of the blocking member 14 as it pivots and alters the pole direction of the magnetic portion 26 to an angle offset from the pole direction generated by the magnetic field. The length differences of the first and second portions 22, 24 of the blocking member 14 reduces the torsion effect by only requiring the magnetic portion 26 to move a small distance away from the electromagnet 27 when moving the blocking member 14 to the unlocked position 18.

Referring now to FIGS. 6-7, one embodiment of the electromagnet assembly 27 is illustrated. In this embodiment, the electromagnet 27 resembles a solenoid, whereby a core wire 66 is wound around an exterior circumference of a polymeric bobbin 68 to contain the core wire 66 in a consistent helical pattern to generate a uniform magnetic field. The polymeric bobbin 68 is secured with opposing ends attached to the outer frame 54 and can be coupled with a diode 70 or other optional componentry to reduce electrical noise generated when discharging an electromagnet. The diode 70 is connected across the core wire 66 leads supported by the bobbin 68. The outer frame 54 may comprises a ferrous material. The core member 28 of the electromagnet assembly 27 in the illustrated embodiment is arranged coaxially with the core wire 66, whereby an outer circumference 72 of the core member 28 abuts an interior circumference 74 of the bobbin shaft. The core member 28 also comprises a ferrous material, such as steel, that is ferromagnetic and configured to carry magnetic flux. The core wire 66 comprises a copper material, although other conductive materials with low electrical resistance may be used.

With further reference to FIGS. 6-7, another function of the outer frame 54 is to amplify and channel electromagnetic flux from the electromagnet coil wire 66 into the area of the hard magnetic portion (i.e. permanent magnet 26) of the blocking member 14. This is accomplished by keeping and maintaining an air gap between the ferromagnetic core member 28 and the outer ferromagnetic outer frame 54 in the region of the magnetic portion of the blocking member 14. Optimization of the surface geometries between the core surface of the electromagnet 27 and the hard magnetic portion of the blocking member 14 will provide greatest attraction force when the electromagnet 27 is not carrying current, greatest push off force when the electromagnetic 27 has current applied, and optimization of the usage of hard magnetic material in the blocking member 14.

Figure 8:
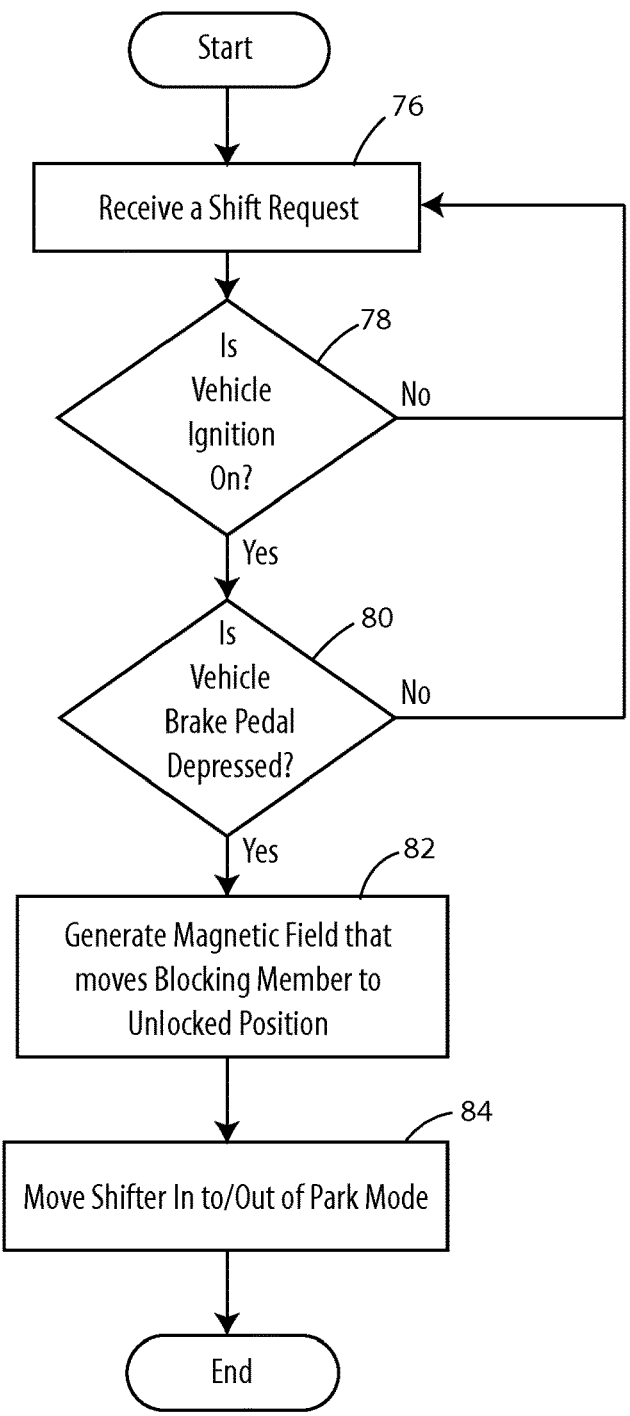
FIG. 8 is a flow diagram illustrating a method for operating a park lock apparatus for a shifter of a vehicle, according to one embodiment.

Referring now to FIG. 8, a method is shown for operating a park lock system 10, according to one embodiment. In the illustrated embodiment, at step 76, a shift request is received, which may include an electrical signal from the shifter 12 or a mechanical movement initiated by the shifter 12, such as the button 38 on the shifter lever 34 being depressed. In some embodiments, the receipt of a shift request may not be necessary for the controller of the lock system 10 to monitor conditions indicative to move the locking member to the unlocked position 18. According to one embodiment, at step 78, a first status condition of the vehicle is monitored, namely whether the ignition condition of the vehicle is on. It is also contemplated that the determination as to whether the engine of the vehicle is running may be made by monitoring additional or alternative status conditions of the vehicle, such as vehicle speed or engine speed. Once it is determined that the first condition is met, at step 80, a second status condition is monitored, namely whether the brake pedal condition of the vehicle is depressed. Again, it is contemplated that the second status condition may be an alternative condition of the vehicle, such as whether brake calipers are engaged or the brake switch has closed. Once the controller has determined that the status conditions of the vehicle are met, the controller may allow electrical current to flow through the core wire 66 of the electromagnet 27 to generate the magnetic field in like polarity to the permanent magnet 26, at step 82, to cause the magnetic portion 26 of the blocking member 14 to move away from the core member 28. The controller may be configured to supply a flow of current sufficient to generate a magnetic field with the required magnitude to move the blocking member 14 from the locked position 16 to the unlocked position 18 with the adequate force. Again, the travel necessary to clear the first portion 22 of the blocking member 14 away from the park notch 46 is increased due to leverage when the force is applied to this second portion 24. Once the blocking member 14 is moved to the unlocked position 18, at step 84, the shifter 12 may freely move into or out of the parking mode by allowing the pawl member 48 to transition into or out of the park notch 46. It is also conceivable that the controller may reverse the flow of current through the electromagnet 27 to generate an opposing magnetic field that attracts the magnetic portion 26 of the blocking member 14 and thereby moves the blocking member 14 back to the locked position 16. The magnetic portion 26 of the blocking member 14 is configured to hold the blocking member 14 in the locked position 16, however, it is contemplated that the electromagnet 27 may constantly generate the opposing magnetic field to attract the permanent magnet 26 with more force than the magnetic portion 26 naturally has in attraction to an end surface of the core member 28.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A lock system for moving a blocking member between a locked position and an unlocked position, comprising:
    a blocking member with at least a portion having hard magnetic properties that defines a magnetic portion; and
    an electromagnet having a core member proximate the magnetic portion of the blocking member and comprising a ferromagnetic material attracted by the magnetic portion for holding the blocking member in the locked position, wherein the electromagnet is configured to generate a magnetic field in like polarity to the magnet portion that causes the blocking member to move away from the core member to the unlocked position;
    wherein the magnetic portion of the blocking member is spaced from the core member in the unlocked position at a distance whereby a magnetic attraction exists between the magnetic portion and the core member that causes the blocking member to move to or remain in the locked position when the magnetic field is not generated by the electromagnet.

2. The lock system of claim 1, wherein the magnetic portion of the blocking member is spaced from the core member in the locked and unlocked positions, and wherein the magnetic portion includes a permanent magnet fixed to the blocking member.

3. The lock system of claim 1, further comprising:
    a controller for supplying a current through the electromagnet to generate the magnetic field based on at least one status condition.

4. The lock system of claim 3, including an electrical circuit operably connecting the electromagnet, the controller, a vehicle ignition switch, and a vehicle brake pedal, and wherein the status condition includes sensing a position of the ignition switch and a position of the brake pedal.

5. A lock system for moving a blocking member between a locked position and an unlocked position, comprising:
    a blocking member with at least a portion having hard magnetic properties that defines a magnetic portion;
    an electromagnet having a core member proximate the magnetic portion of the blocking member and comprising a ferromagnetic material attracted by the magnetic portion for holding the blocking member in the locked position, wherein the electromagnet is configured to generate a magnetic field in like polarity to the magnet portion that causes the blocking member to move away from the core member to the unlocked position; and
    a controller for supplying a current through the electromagnet to generate the magnetic field based on at least one status condition;
    wherein the controller is configured to reverse the current through the electromagnet to generate an opposing magnetic field that attracts the magnetic portion of the blocking member and thereby moves the blocking member to the locked position with greater moving range and force than a natural attraction force between the magnetic portion and the core member due to hard magnetic properties of the magnetic portion and the core member.

6. The lock system of claim 1, wherein the core member includes an end surface substantially parallel with an exterior surface of the magnetic portion of the blocking member in the locked position.

7. The lock system of claim 6, wherein the electromagnet includes a wire surrounding the core member in a helical arrangement to provide a dipole moment aligned with a central axis of the core member.

8. A park lock system for a shifter of an automatic transmission, comprising:
    a blocking member having a pivot axis for pivoting the blocking member between a locked position to prevent movement of the shifter and an unlocked position for allowing movement of the shifter;
    a permanent magnet coupled with the blocking member; and
    an electromagnet having a core member proximate the permanent magnet, wherein the electromagnet is configured to generate a magnetic field in like polarity to the permanent magnet that moves the blocking member to the unlocked position;
    wherein the permanent magnet is spaced from the core member in the unlocked position at a distance whereby a magnetic attraction between the permanent magnet and the core member causes the blocking member to move to or remain in the locked position when the magnetic field is not generated by the electromagnet;
    and wherein the permanent magnet is spaced apart from the core member to form an air gap therebetween when the blocking member is in the locked position.

9. The park lock system of claim 8, wherein the blocking member includes a first portion, a second portion on opposing sides of the pivot axis, such that the first portion prevents movement of the shifter in the locked position and the permanent magnet is coupled with the second portion.

10. The park lock system of claim 8, wherein the permanent magnet is spaced from the core member in the locked and unlocked positions, and wherein the core member comprises a ferromagnetic material attracted by the permanent magnet for holding the blocking member in the locked position.

11. The park lock system of claim 8, further comprising:
a controller for actuating the electromagnet to generate the magnetic field based on a status condition.

12. The park lock system of claim 11, wherein the controller is programmed to create at least one signal indicating status conditions including an ignition condition and a brake pedal condition.

13. A park lock system for a shifter of an automatic transmission, comprising:
a blocking member having a pivot axis for pivoting the blocking member between a locked position to prevent movement of the shifter and an unlocked position for allowing movement of the shifter;
a permanent magnet coupled with the blocking member; and
an electromagnet having a core member proximate the permanent magnet, wherein the electromagnet is configured to generate a magnetic field in like polarity to the permanent magnet that moves the blocking member to the unlocked position;
a controller for actuating the electromagnet to generate the magnetic field based on a status condition;
wherein the controller selectively allows a current to flow through the electromagnet to generate the magnetic field;
wherein the controller is configured to reverse the current through the electromagnet to generate an opposing magnetic field that attracts the permanent magnet and thereby moves the blocking member to the locked position.

14. The park lock system of claim 8, wherein the core member includes a cylindrical shape with an end surface substantially parallel with an exterior surface of the permanent magnet in the locked position.

15. The park lock system of claim 14, wherein the electromagnet includes a wire surrounding a circumference of the core member in a helical arrangement to provide a dipole moment aligned with a central axis of the core member.

16. A park lock system for a shifter of an automatic transmission that is movable between operating modes of the automatic transmission including a park mode, comprising:
a shifter housing having a gate opening with a series of notches including a park notch;
a pawl member movable within the gate opening for engaging a select one of the series of notches to engage a corresponding operating mode of the automatic transmission, including the park notch to engage the park mode;
a blocking member pivotally coupled with the shifter housing and having a first portion, a second portion, and a pivot axis therebetween for pivoting the blocking member between a locked position for the first portion to prevent movement of the pawl member out of the park notch and an unlocked position for allowing movement of the pawl member out of the park notch;
a permanent magnet coupled with the second portion of the blocking member; and
an electromagnet coupled with the shifter housing proximate the second portion of the blocking member, wherein the electromagnet includes a core member and is configured to generate a magnetic field in repelling polarity to the permanent magnet that causes the blocking member to move to the unlocked position;
wherein the permanent magnet is spaced from the core member in the unlocked position at a distance whereby a magnetic attraction between the permanent magnet and the core member causes the blocking member to move to the locked position when the magnetic field is not generated by the electromagnet.

17. The park lock system of claim 16, wherein the permanent magnet is spaced from the core member in the locked and unlocked positions.

18. The park lock system of claim 16, wherein the core member comprises a ferromagnetic material attracted by the permanent magnet for holding the blocking member in the locked position.

19. The park lock system of claim 16, further comprising:
a controller for actuating the electromagnet to generate the magnetic field based on a status condition.

20. The park lock system of claim 19, wherein the status conditions include an ignition condition and a brake pedal condition.

21. A park lock system for a shifter of an automatic transmission that is movable between operating modes of the automatic transmission including a park mode, comprising:
a shifter housing having a gate opening with a series of notches including a park notch;
a pawl member movable within the gate opening for engaging a select one of the series of notches to engage a corresponding operating mode of the automatic transmission, including the park notch to engage the park mode;
a blocking member pivotally coupled with the shifter housing and having a first portion, a second portion, and a pivot axis therebetween for pivoting the blocking member between a locked position for the first portion to prevent movement of the pawl member out of the park notch and an unlocked position for allowing movement of the pawl member out of the park notch;
a permanent magnet coupled with the second portion of the blocking member; and
an electromagnet coupled with the shifter housing proximate the second portion of the blocking member, wherein the electromagnet includes a core member and is configured to generate a magnetic field in repelling polarity to the permanent magnet that causes the blocking member to move to the unlocked position;
wherein the permanent magnet is spaced from the core member in the unlocked position at a distance whereby an attraction between the permanent magnet and the core member causes the blocking member to move to the locked position when the magnetic field is not generated by the electromagnet; and
a controller for actuating the electromagnet to generate the magnetic field based on a status condition;
wherein the controller allows a current to flow through the electromagnet to generate the magnetic field;
wherein the controller is configured to reverse the current through the electromagnet to generate an opposing magnetic field that attracts the permanent magnet and thereby causes the blocking member to move to or remain in the locked position.

22. The park lock system of claim 16, wherein the core member includes a cylindrical shape with an end surface substantially parallel with an exterior surface of the permanent magnet in the locked position.

23. The park lock system of claim 22, wherein the electromagnet includes a wire surrounding a circumference of the core member in a helical arrangement to provide a dipole moment aligned with a central axis of the core member.

* * * * *